(12) United States Patent
Chang

(10) Patent No.: US 12,209,574 B2
(45) Date of Patent: Jan. 28, 2025

(54) AIR-ACTUATED POWER GENERATING SYSTEM

(71) Applicant: Tien-Ming Chang, Wandam Township, Pingtung County (TW)

(72) Inventor: Tien-Ming Chang, Wandam Township, Pingtung County (TW)

( * ) Notice: Subject to any disclaimer, the term of this patent is extended or adjusted under 35 U.S.C. 154(b) by 22 days.

(21) Appl. No.: 18/167,328

(22) Filed: Feb. 10, 2023

(65) Prior Publication Data

US 2024/0068446 A1    Feb. 29, 2024

(30) Foreign Application Priority Data

Aug. 26, 2022 (TW) ................. 111132321

(51) Int. Cl.
| | |
|---|---|
| F03D 9/00 | (2016.01) |
| F03D 9/17 | (2016.01) |
| F03D 9/28 | (2016.01) |
| H02K 7/18 | (2006.01) |

(52) U.S. Cl.
CPC ............. F03D 9/28 (2016.05); F03D 9/17 (2016.05); H02K 7/183 (2013.01)

(58) Field of Classification Search
CPC .. F03D 9/28; F03D 9/17; F03D 80/80; H02K 7/183
See application file for complete search history.

(56) References Cited

U.S. PATENT DOCUMENTS

| 9,217,412 B2 * | 12/2015 | Blake ................. F03D 15/00 |
| 2011/0233934 A1 * | 9/2011 | Crane ................. F03D 15/10 |
| | | 290/55 |
| 2017/0101981 A1 * | 4/2017 | Ozcan ................. F03D 80/80 |

* cited by examiner

Primary Examiner — Julio C. Gonzalez
(74) Attorney, Agent, or Firm — MUNCY, GEISSLER, OLDS & LOWE, P.C.

(57) ABSTRACT

An air-actuated power generating system includes a housing assembly mounted on an air storage device. An air compressor is disposed within the housing assembly and communicates with the air storage device to compress air into pressurized air and to transmit the pressurized air to the air storage device. A vane assembly is disposed on the housing assembly and is connected to the air compressor so as to be rotated by wind to drive operation of the air compressor. An air-actuated motor is connected to the air storage device. A power generator is connected to the air-actuated motor. The air-actuated motor is operable by the pressurized air discharged from the air storage device, thereby driving the power generator to generate electricity.

8 Claims, 4 Drawing Sheets

AIR-ACTUATED POWER GENERATING SYSTEM

CROSS-REFERENCE TO RELATED APPLICATION

This application claims priority to Taiwanese Patent Application No. 111132321, filed on Aug. 26, 2022.

FIELD

The disclosure relates to a power generating system, and more particularly to an air-actuated power generating system.

BACKGROUND

Wind power, like hydropower and solar power, is eco-friendly in its method of generating electricity. Generally, in addition to using the wind power directly, extra wind power that is generated from the process may be stored in batteries. Currently, lithium batteries are commonly used to store the extra power. However, the lithium batteries often have to be replaced due to their limited lifespan, and therefore are not eco-friendly due to issues such as waste disposal. In addition, costs of storing/utilizing the extra power is also a concern.

SUMMARY

Therefore, an object of the disclosure is to provide an air-actuated power generating system that can alleviate at least one of the drawbacks of the prior art.

According to the disclosure, an air-actuated power generating system includes an air storage device, a housing assembly, an air compressor, a vane assembly, and a power generating device.

The housing assembly is rotatably mounted on the air storage device.

The air compressor is disposed within the housing assembly and fluidly communicates with the air storage device. The air compressor is adapted to compress air into pressurized air, and to transmit the pressurized air to the air storage device.

The vane assembly is disposed on the housing assembly and is connected to the air compressor. The vane assembly is adapted to be rotated by wind to drive operation of the air compressor.

The power generating device includes an air-actuated motor that is fluidly connected to the air storage device, and a power generator that is connected to the air-actuated motor.

The air-actuated motor is operable by the pressurized air discharged from the air storage device, thereby driving the power generator to generate electricity.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
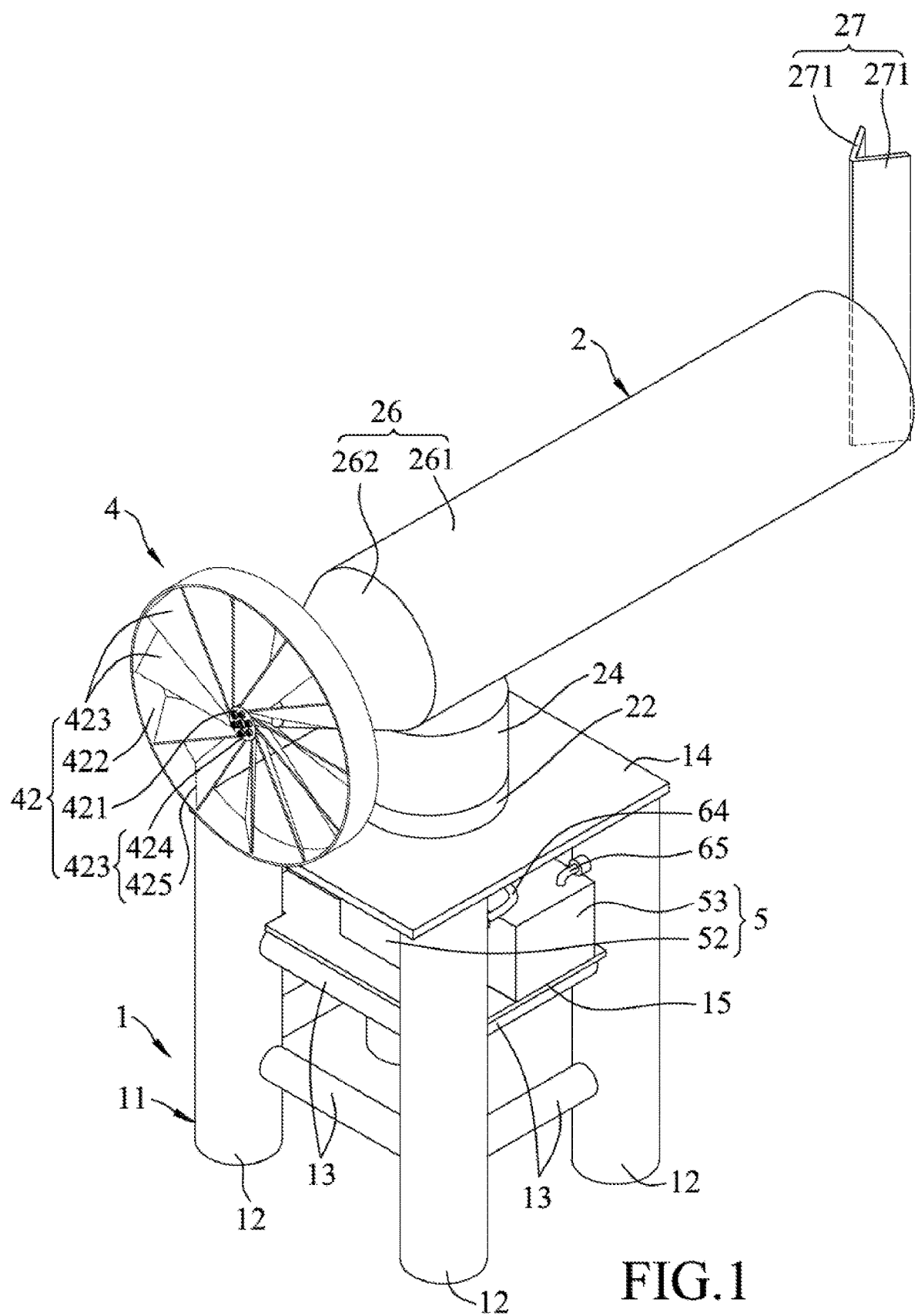
FIG. 1 is a perspective view illustrating an air-actuated power generating system according to an embodiment of the disclosure.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
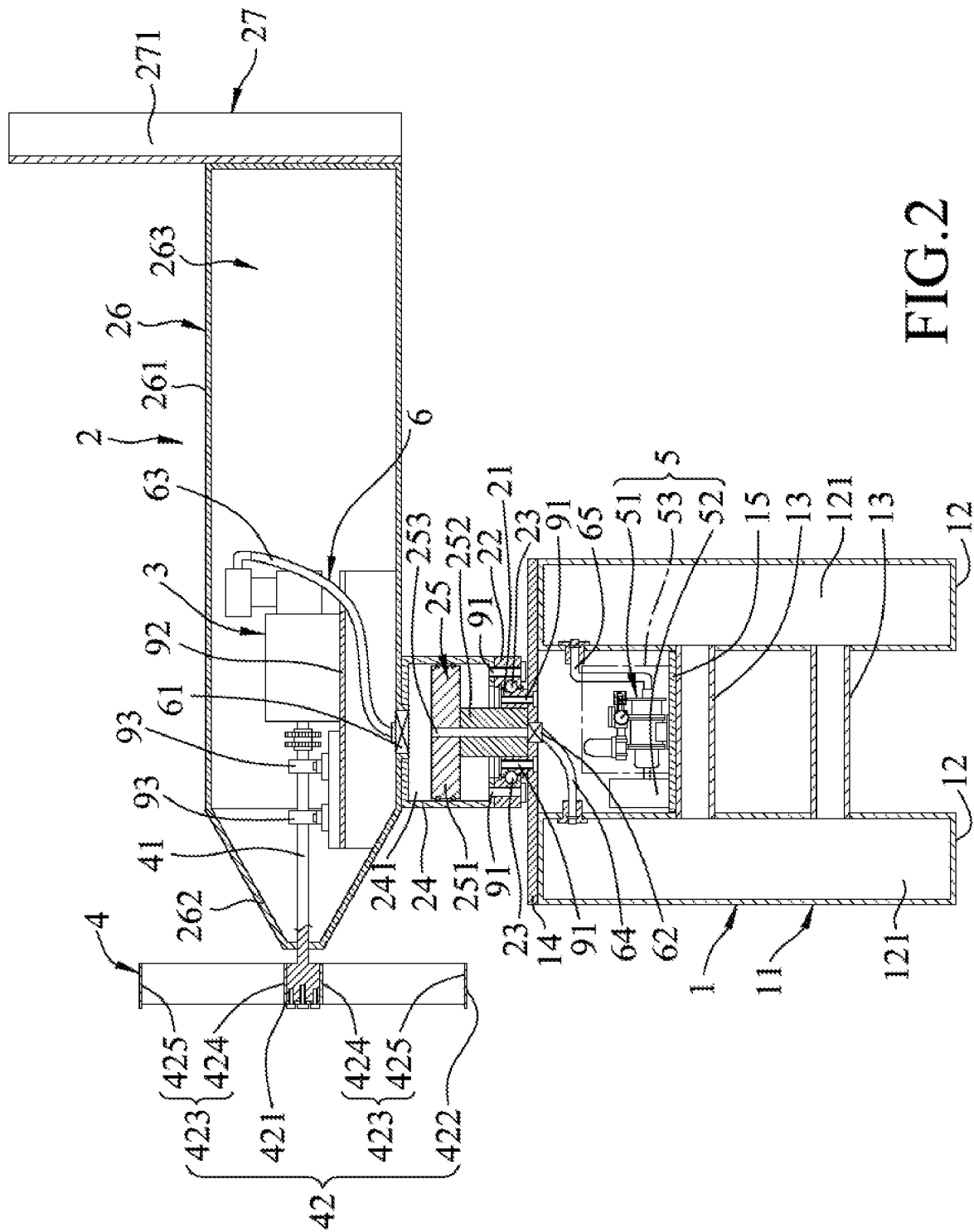
FIG. 2 is a schematic sectional view of the embodiment.
Figure 3:
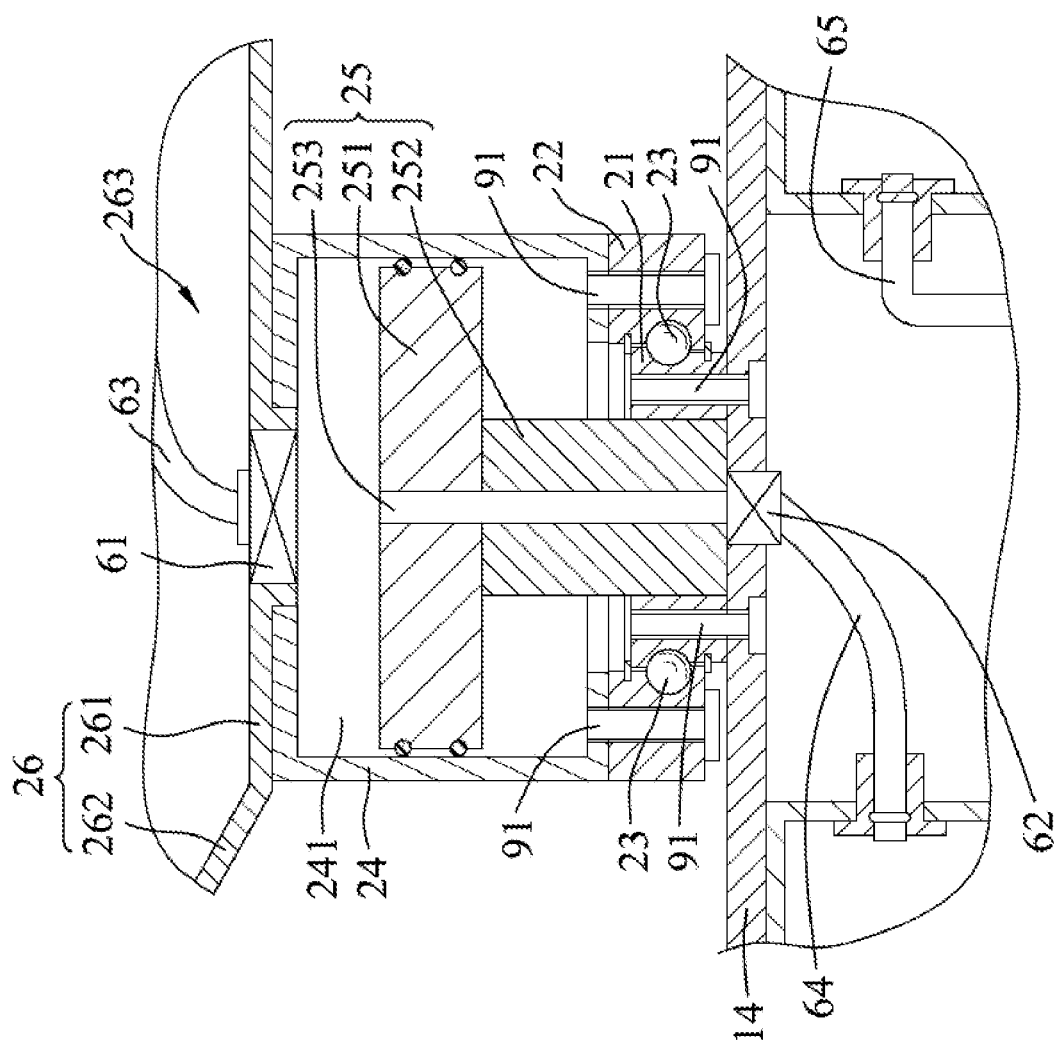
FIG. 3 is a fragmentary enlarged sectional view of the embodiment.

Referring to FIGS. 1 to 3, an air-actuated power generating system according to an embodiment of the disclosure is illustrated and is operated by wind. In this embodiment, the wind is caused by movement of an air flow. In other embodiments, the air-actuated power generating system of the disclosure may be operated by other types of gases in lieu of air.

The air-actuated power generating system includes an air storage device 1, a housing assembly 2 rotatably mounted on the air storage device 1, an air compressor 3 disposed within the housing assembly 2 and fluidly communicating with the air storage device 1, a vane assembly 4 disposed on the housing assembly 2 and connected to the air compressor 3, a power generating device 5, and a delivery device 6.

The air storage device 1 is disposed on a ground surface and includes a storage unit 11. The storage unit 11 includes four air reservoirs 12 (only three are shown in FIG. 1) spaced apart from each other and arranged in a matrix manner, a plurality of communicating pipes 13 interconnecting the air reservoirs 12, a first support member 14 mounted on the air reservoirs 12, and a second support members 15 mounted on some of the communicating pipes 13 situated on same level.

Each of the air reservoirs 12 is formed in an upright hollow cylindrical shape and defines an air-receiving space 121 that is adapted for receiving pressurized air. The air-receiving space 121 of one of the air reservoirs 12 is directly connected to the air compressor 3. The communicating pipes 13 and the air reservoirs 12 are alternately arranged. Each of the communicating pipes 13 interconnects by welding a respective adjacent pair of the air reservoirs 12. As a result, each of the communicating pipes 13 not only interconnects the air receiving spaces 121 of the respective adjacent pair of the air reservoirs 12, but also supports and positions the respective adjacent pair of the air reservoirs 12.

Figure 4:
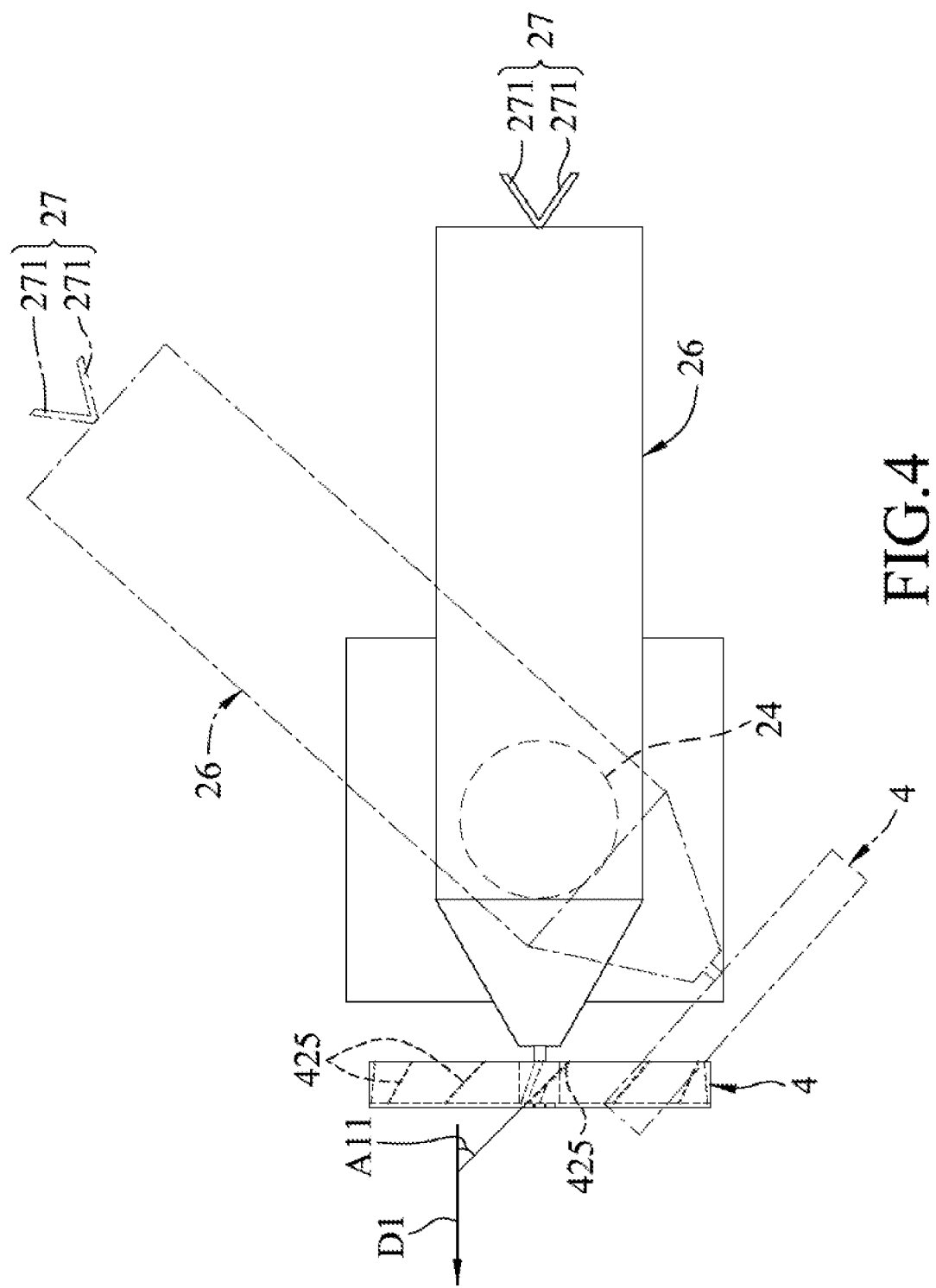
FIG. 4 is a schematic top view of the embodiment illustrating a housing body together with a vane assembly 4 of the air-actuated power generating system to rotate in different directions.

Referring to FIGS. 2 to 4, the housing assembly 2 is mounted on the first support member 14, and includes an annular body 21, a rotary body 22, a plurality of rollers 23, a tubular body 24, an insertion member 25, a housing body 26, and a guiding member 27. The annular body 21 is fixedly disposed on the first support member 14. The rotary body 22 is disposed rotatably around the annular body 21. The rollers 23 are disposed between the annular body 21 and the rotary body 22. The tubular body 24 is fixed between the rotary body 22 and the housing body 26. The insertion member 25 has an end disposed in the tubular body 24, and an opposite end extending into the annular body 21. The housing body 26 accommodates the air compressor 3 and is mounted with the vane assembly 4. Because the rotary body 22 is disposed rotatably around the annular body 21 that is fixedly disposed on the first support member 14, and because the tubular body 24 is fixed between the rotary body 22 and the housing body 26, the housing body 26 is rotatably mounted on the air storage device 1. The guiding member 27 is mounted to the housing body 26.

In this embodiment, the annular body 21 and the rotary body 22 cooperate with each other to form a turntable. The annular body 21 is fixed to the first support member 14 by a plurality of fastening members 91. The rollers 23 facilitate the rotary body 22 to rotate relative to the annular body 21.

The tubular body 24 is in a cylindrical form and is fixed to the rotary body 22 through a plurality of fastening members 91 so as to rotate together with the rotary body 22 with respect to the insertion member 25.

The insertion member 25 has a first inserting portion 251, a second inserting portion 252, and an air delivery channel 253. The first inserting portion 251 is in a disc form and is disposed in the tubular body 24 in an airtight manner. The second inserting portion 252 is in a cylindrical form and is inserted into the annular body 21. The air delivery channel 253 extends through the first and second inserting portions 251, 252, and has an open end directly connected to an inner space 241 defined between the first inserting portion 251 and the tubular body 24.

The housing body 26 accommodates the air compressor 3 and is mounted with the vane assembly 4. The housing body 26 has a main cylindrical portion 261 extending in a longitudinal direction of the housing body 26, and a truncated cone portion 262 tapered forwardly from the main cylindrical portion 261. The main cylindrical portion 261 and the truncated cone portion 262 cooperatively define a housing space 263 that accommodates the air compressor 3 and that fluidly communicates with an external environment.

The guiding member 27 is welded to an end of the main cylindrical portion 261 in a manner that the guiding member 27 and the vane assembly 4 are respectively located at two opposite ends of the housing body 26. The guiding member 27 includes two plate bodies 271 that are connected to the housing body 26 and that are transverse to each other. Each of the plate bodies 271 is lengthened in a top-bottom direction. The plate bodies 271 form a V-shaped structure (see FIG. 4).

The air compressor 3 is mounted on a support frame 92 situated within the housing space 263. The air compressor 3 is capable of compressing air into pressurized air, and transmitting the pressurized air to the air storage device 1. The pressurized air from the air compressor 3 is at a pressure greater than one atmosphere. Specifically, the pressurized air is at a pressure of 20 kg/cm² in order to be effectively stored and utilized.

The vane assembly 4 includes a driving spindle 41 and a vane unit 42.

The driving spindle 41 is rotatable about an axis thereof, and has an end extending into the housing body 26 of the housing assembly 2 and connected to the air compressor 3. In this embodiment, as shown in FIG. 4, the driving spindle 41 extends in an axial direction (D1) parallel with the longitudinal direction of the housing body 26. Referring back to FIG. 2, two spaced-apart bearing members 93 are mounted on the support frame 92 and are disposed around the driving spindle 41 in a vicinity of the end of the driving spindle 41 connected to the air compressor 3. Another end of the spindle 41 is opposite to the air compressor 3 and extends outwardly of the truncated cone portion 262.

Referring back to FIGS. 1, 2, and 4, the vane unit 42 is disposed outside the housing body 26 of the housing assembly 2 and is connected to another end of the spindle 41 opposite to the air compressor 3. The vane unit 42 includes a hub 421 that is connected to and co-rotatable with another end of the spindle 41 opposite to the air compressor 3, an outer ring 422 that surrounds the hub 421, and a plurality of vanes 423 that are connected between the hub 421 and the outer ring 422.

Each of the vanes 423 includes a first vane end 424 connected to the hub 421 and a second vane end 425 connected to the outer ring 422. As shown in FIG. 4, the second vane end 425 of each of the vanes 423 is inclined at an extension angle (A11) relative to the axial direction (D1).

The extension angle (A11) is 45 degrees. However, in other embodiments, the extension angle (A11) may range between 45 and 65 degrees.

Referring back to FIGS. 1 to 3, the power generating device 5 includes an air-actuated motor 51 that is fluidly connected to the air storage device 1, and a power generator 52 that is connected to the air-actuated motor 51. The air-actuated motor 51 and the power generator 52 are mounted on the second support member 15. The air-actuated motor 51 is covered by a cover 53.

In this embodiment, the air-actuated motor 51 is operable by the pressurized air discharged from the air storage device 1, thereby driving the power generator 52 to generate electricity. Since the air-actuated motor 51 and the power generator 52 are well known in the art, details thereof are omitted.

The delivery device 6 delivers the pressurized air from the air compressor 3 to one of the air reservoirs 12. The delivery device 6 includes a first air valve 61, a second air valve 62, a first tube 63, a second tube 64, and a third tube 65. The first air valve 61 fluidly communicates with the housing space 263 and the tubular space 241. The second air valve 62 is connected to the first support member 14 and fluidly communicates with another open end of the air delivery channel 253 adjacent to the first support member 14. The first tube 63 is connected between the air compressor 3 and the first air valve 61. The second tube 64 is connected between the second air valve 62 and a corresponding one of the air reservoirs 12. The third tube 65 is connected between the air-actuated motor 51 and another one of the air reservoirs 12.

The first tube 63, the second tube 64, and the third tube 65 are a commercially available high-pressure hose that may withstand a pressure of 210 kg/cm². Since the high-pressure hose and the air valve are well known in the art, detailed descriptions thereof are omitted herein.

When the air-actuated power generating system is in use and when winds act on the van unit 42, the vane unit 42 rotates the driving spindle 41 to drive operation of the air compressor 3 so that the air compressor 3 draws and compresses the air in the housing space 263 into pressured air. The pressured air is delivered to and stored in the air-receiving spaces 121 of the air reservoirs 12 by passing through the first tube 63, the first air valve 61, the tubular space 241, the air delivery channel 253, the second air valve 62, and the second tube 64 until the air-receiving spaces 121 of the air reservoirs 12 are at a pressure of 20 kg/cm². Since measuring the pressure in the air receiving space 121 is not the focus of the disclosure, details thereof are omitted herein.

When there is a need for outputting power, the air-actuated motor 51 will be driven by the pressurized air from the air receiving spaces 121 of the air reservoirs 12 passing through the third tube 65, thereby outputting mechanical power to drive the power generator 52 to generate electricity.

Since the kinetic energy of wind is converted into pressurized air for storage, and since the stored pressurized air drives operation of the air-actuated motor 51 when the air-actuated motor 51 needs to output power, one of the features of the disclosure resides in that the cost for storing pressurized air is low and the stored pressurized air may be directly discharged without causing environmental pollution and producing waste.

Referring back to FIGS. 1, 2, and 4, another feature of the disclosure resides in that, by virtue of the annular body 21, the rotary body 22, and the tubular body 24, the housing body 26 is rotatable to meet different wind directions (see FIG. 4). Additionally, the guiding member 27 affected by wind may automatically change an orientation of the housing body 26 so that the vane unit 42 may face the wind directly, thereby effectively and continuously utilizing the wind.

By virtue of the second vane end 425 of each of the vanes 423 being connected to the outer ring 422, the vane unit 42 may stably operate without producing noise.

In this embodiment, the air storage device 1 includes only one storage unit 11; however, a plurality of the storage units 11 may be included in other embodiments in a manner that the air reservoirs 12 of the storage units 11 fluidly communicate with each other. In other words, the storage units 11 in other embodiments may increase in numbers and fluidly communicate with each other so that a storage capacity may be varied to store a large amount of pressurized air depending on actual requirements.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An air-actuated power generating system, comprising:
   an air storage device;
   a housing assembly rotatably mounted on said air storage device;
   an air compressor disposed within said housing assembly and fluidly communicating with said air storage device, said air compressor being adapted to compress air into pressurized air, and to transmit the pressurized air to said air storage device;
   a vane assembly disposed on said housing assembly and connected to said air compressor, said vane assembly being adapted to be rotated by winds to drive operation of said air compressor; and
   a power generating device including
      an air-actuated motor that is fluidly connected to said air storage device, and
      a power generator that is connected to said air-actuated motor;
   wherein said air-actuated motor is operable by the pressurized air discharged from said air storage device, thereby driving said power generator to generate electricity;
   wherein said air storage device includes at least one storage unit that includes
      a plurality of air reservoirs spaced apart from each other,
      a plurality of communicating pipes interconnecting said air reservoirs,
      a first support member mounted on said air reservoirs, and
      a second support members mounted on said communicating pipes;
   wherein each of said air reservoirs defines an air-receiving space that is adapted for receiving the pressurized air, said air-receiving space of one of said air reservoirs being directly connected to said air compressor;
   wherein said communicating pipes and said air reservoirs are alternately arranged, each of said communicating pipes interconnecting said air receiving spaces of a respective adjacent pair of said air reservoirs;
   wherein said housing assembly is mounted on said first support member; and
   wherein said air-actuated motor and said power generator are mounted on said second support member.

2. The air-actuated power generating system as claimed in claim 1, wherein:
   said housing assembly includes
      a housing body that accommodates said air compressor and that is mounted with said vane assembly, and
      a guiding member that is mounted to said housing body;
   said housing body is rotatably mounted on said air storage device;
   said guiding member and said vane assembly are respectively located at two opposite ends of said housing body; and
   said guiding member includes two plate bodies that are connected to said housing body and that are transverse to each other.

3. The air-actuated power generating system as claimed in claim 2, wherein:
   each of said plate bodies is lengthened in a top-bottom direction; and
   said plate bodies form a V-shaped structure.

4. The air-actuated power generating system as claimed in claim 1, wherein said housing assembly includes:
   a housing body that accommodates said air compressor and that is mounted with said vane assembly;
   an annular body that is fixedly disposed on said first support member;

a rotary body that is disposed rotatably around said annular body;
a plurality of rollers that are disposed between said annular body and said rotary body;
a tubular body that is fixed between said rotary body and said housing body; and
an insertion member that has an end disposed in said tubular body, and an opposite end extending into said annular body.

5. The air-actuated power generating system as claimed in claim 4, wherein:
said housing body defines a housing space that accommodates said air compressor;
said insertion member has
a first inserting portion that is disposed in said tubular body,
a second inserting portion that is inserted into said annular body, and
an air delivery channel that extends through said first and second inserting portions, and that has an open end directly connected to an inner space defined between said first inserting portion and said tubular body;
said air-actuated power generating system further comprises a delivery device that delivers the pressurized air from said air compressor to one of said air reservoirs; and
said delivery device includes
a first air valve that fluidly communicates with said housing space and said tubular space,
a second air valve that is connected to said first support member and that fluidly communicates with another open end of said air delivery channel,
a first tube that is connected between said air compressor and said first air valve, and
a second tube that is connected between said second air valve and said one of said air reservoirs.

6. The air-actuated power generating system as claimed in claim 1, wherein:
said vane assembly includes
a driving spindle that is rotatable about an axis thereof and that has an end extending into said housing assembly and connected to said air compressor, and
a vane unit that is disposed outside said housing assembly and that is connected to another end of said spindle opposite to said air compressor; and
said van unit includes
a hub that is connected to said another end of said spindle,
an outer ring that surrounds said hub, and
a plurality of vanes that are connected between said hub and said outer ring.

7. The air-actuated power generating system as claimed in claim 6, wherein:
said driving spindle extends in an axial direction;
each of said vanes includes a first vane end connected to said hub and a second vane end connected to said outer ring; and
said second vane end of each of said vanes is inclined at an extension angle relative to said axial direction, said extension angle ranging between 45 and 65 degrees.

8. The air-actuated power generating system as claimed in claim 7, wherein said extension angle is 45 degrees.

* * * * *